United States Patent [19]
Hartwig

[11] 3,760,872
[45] Sept. 25, 1973

[54] STRUCTURAL MEMBER HAVING DIFFERENTIAL TEMPERATURE CONTROL MEANS AND COMBINATION OF SUCH STRUCTURAL MEMBER WITH HORIZONTAL STRIPPER FOR GRATE CONVEYOR

[75] Inventor: Walter J. Hartwig, Oconomowoc, Wis.

[73] Assignee: Allis-Chalmers Corporation, Milwaukee, Wis.

[22] Filed: Jan. 10, 1972

[21] Appl. No.: 216,641

[52] U.S. Cl.................. 165/120, 266/20, 165/1, 165/47, 34/120
[51] Int. Cl............................................. F28f 13/14
[58] Field of Search ............... 165/47, 120; 266/21, 266/20; 75/3; 263/32; 9/53; 34/120

[56] References Cited
UNITED STATES PATENTS

| | | | |
|---|---|---|---|
| 3,684,005 | 8/1972 | Ellithorpe et al. | 165/120 |
| 2,380,056 | 7/1945 | Lloyd | 266/21 X |
| 3,685,576 | 8/1972 | North | 165/47 |
| 3,322,414 | 5/1967 | Boron | 266/21 |

Primary Examiner—Charles J. Myhre
Assistant Examiner—Theophil W. Streule, Jr.
Attorney—Robert C. Sullivan et al.

[57] ABSTRACT

An apparatus for and a method of controlling the temperature differential between different surfaces or walls of a structural member such as a hollow box beam, and a structural member whose temperature differential is so controlled. The invention has important utility in the combination in which it controls the temperature differential between the opposite walls of the box beam which conventionally supports the horizontal stripper member used for stripping hot ore pellets or the like from the surface of a grate conveyor or the like since one of the walls of the box beam which supports the horizontal stripper is normally subjected to much higher temperatures than the opposite wall thereof, causing undesirable deflection of the beam. In accordance with an embodiment of the invention, a partition is provided inside the hollow box beam at a predetermined spacing from the hotter wall, whereby to define a cooling chamber for the hotter wall, and cooling air is circulated through the cooling chamber at a predetermined velocity and pressure, whereby to reduce the temperature of the hotter wall and thereby reduce the temperature differential between the two opposite walls of the box beam. Means may be provided for sensing the temperature differential between the opposite walls of the beam and for controlling a variable or variables such as the velocity and pressure of air passing through the cooling chamber as a function of the sensed temperature differential whereby to maintain the temperature differential between the opposite walls at an acceptable value.

20 Claims, 7 Drawing Figures

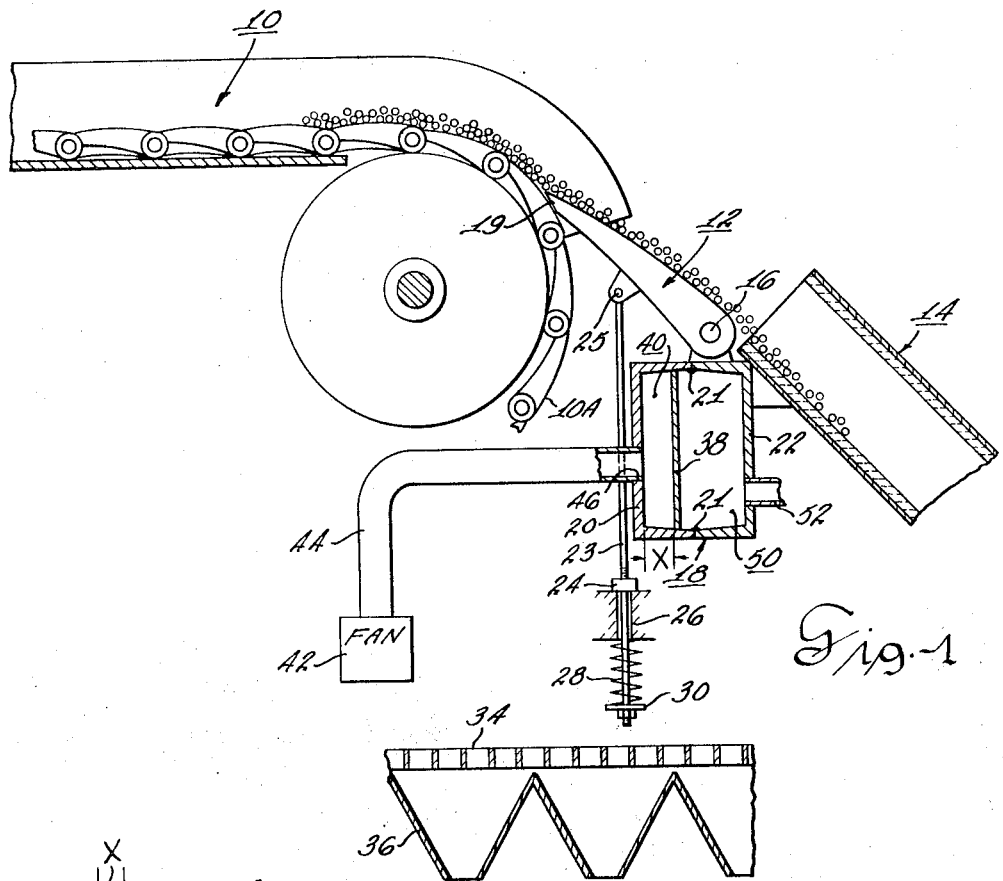
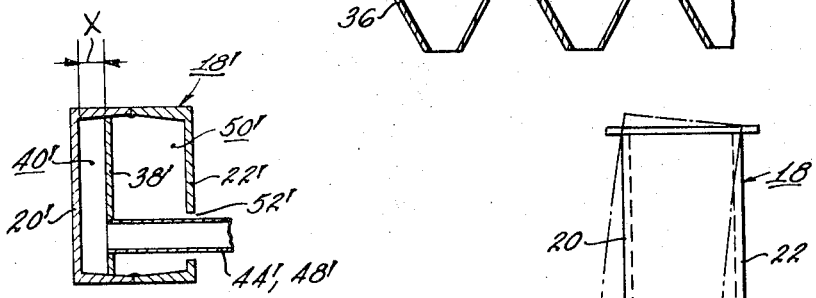
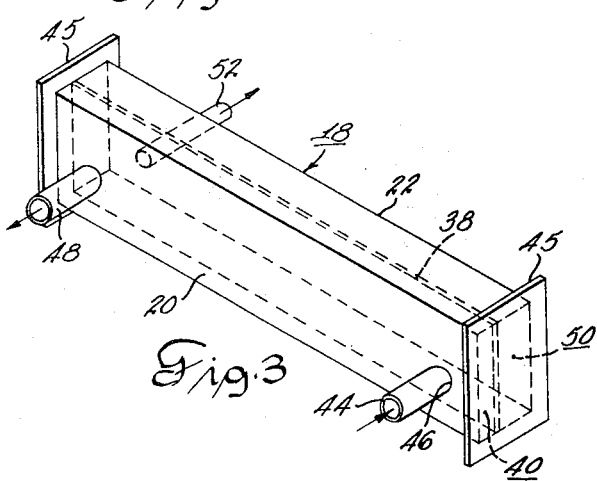
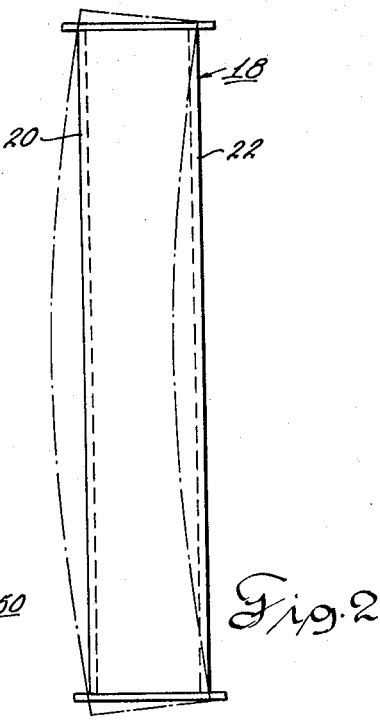

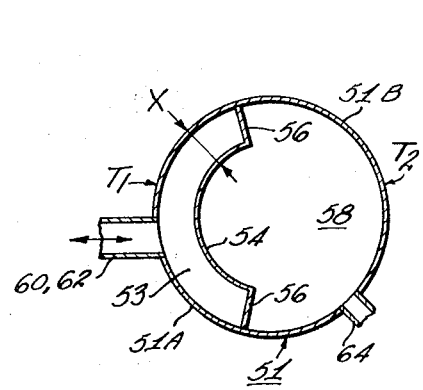
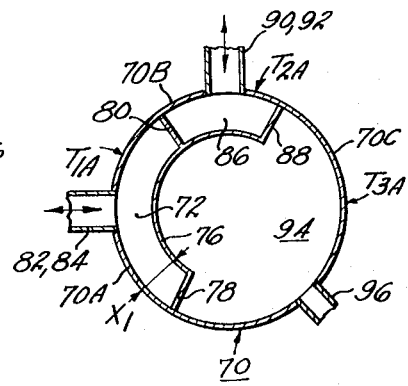
Fig. 5   Fig. 6
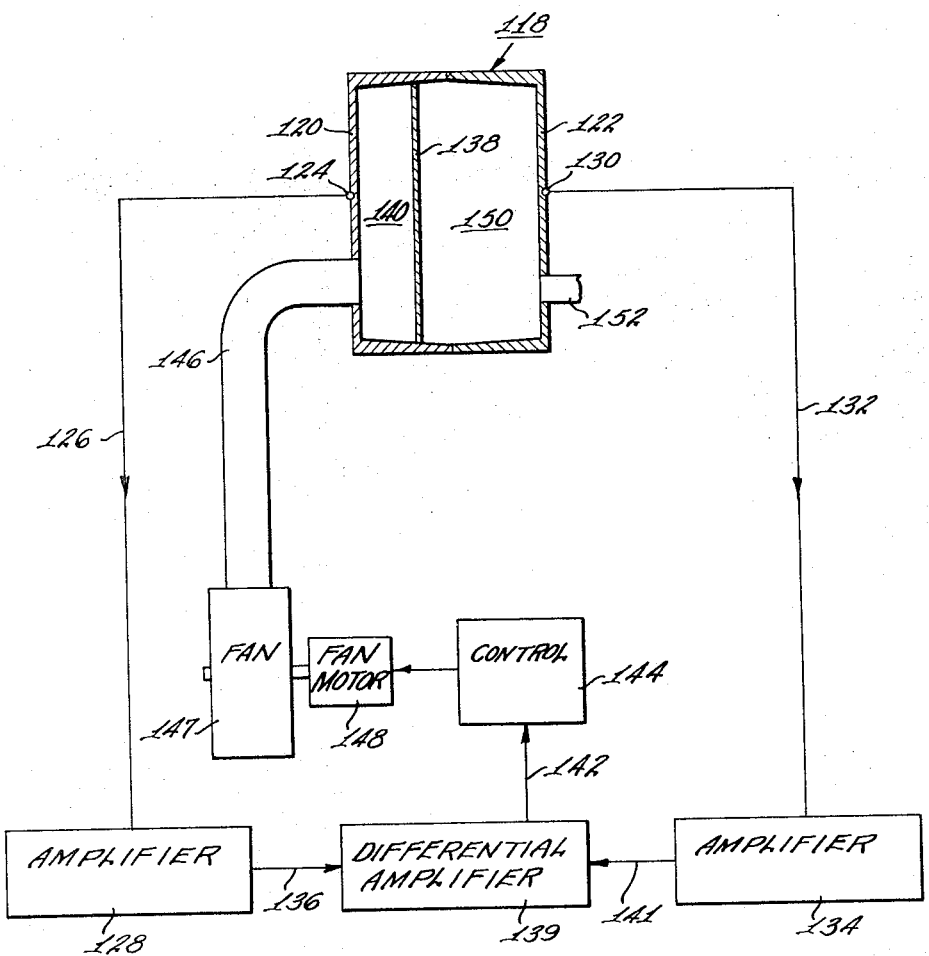
Fig. 7

STRUCTURAL MEMBER HAVING DIFFERENTIAL TEMPERATURE CONTROL MEANS AND COMBINATION OF SUCH STRUCTURAL MEMBER WITH HORIZONTAL STRIPPER FOR GRATE CONVEYOR

BACKGROUND OF THE INVENTION

1. Field of the Invention

This invention relates to an apparatus for and a method of controlling the temperature differential between different surfaces of a structural member such as a hollow box beam, to a structural member whose temperature differential is so controlled, and to the combination of a structural member whose temperature is so controlled used as a support for the horizontal stripper for a grate conveyor or the like.

The invention has important utility particularly in controlling the temperature differential between the opposite walls of the box beam which conventionally supports the horizontal stripper member (sometimes referred to as "end stripper member") used for stripping hot ore pellets or the like from the surface of a moving grate conveyor in a system of the general type shown for example in U.S. Pat. Nos. 2,925,336 — Stowasser, 3,110,483 — Baxa, 3,110,751 — Bade, and 3,396,952 — Jennrich et al. A horizontal stripper of the type which might be supported by a box beam in accordance with the present invention is also shown, for example, as element 14 in U.S. Pat. No. 3,160,266 — Edwards. The horizontal stripper member strips the material from the grate conveyor at the end of the upper run of the grate conveyor and directs the material so stripped to other equipment such as a rotary kiln. In a typical installation, the box beam which supports the horizontal stripper might be, for example, 18 feet in length in a direction transverse of the direction of travel of the grate conveyor. Furthermore, while only one horizontal stripper 12 has been shown and described in connection with the illustrated embodiment, in practice a plurality of such horizontal strippers (such as nine, for example) might be similarly mounted along the length of the horizontal stripper support beam 18. Each horizontal stripper 12 might extend 2 feet, for example, along the length of beam 18 in a direction transverse of the direction of travel of the grate conveyor.

2. Description of the Prior Art

A serious problem which occurs in connection with the prior art box beams used to support stripper members of the type just described is the fact that the longitudinal wall or web of the box beam which faces or is closest to the traveling grate reaches a much higher temperature than the opposite longitudinal wall or web of the beam. Thus, for example, in a typical installation, the temperature of the traveling grate strand reaches a red hot temperature range of approximately 1,200° – 1,400° F., and frequently as high as 1,600° F, causing the wall of the horizontal stripper support beam which faces the travelling grate to be heated principally by thermal radiation to a high temperature in the vicinity of the temperature of the travelling grate. On the other hand, the opposite wall of the stripper support beam usually is in an atmosphere of approximately 400° – 500° F., so that the temperature of the opposite wall is at a substantially lower temperature than the beam wall which faces the grate conveyor.

As a result of the temperature differential between the opposite faces or walls of the horizontal stripper support beam, as just described, the stripper support beam deflects in the direction of the hotter wall of the beam — i.e., in the direction of the beam wall facing the hot grate strand. This deflection of the stripper support beam due to a temperature differential between the opposite longitudinal walls thereof causes the horizontal stripper to be pushed toward the traveling grate thereby causing excessive wear on the stripper edge contiguous the moving grate strand.

Any attempts in the prior art to adjust the position of the horizontal stripper to compensate for the deflection of the stripper support beam may, under other or changed operating conditions, cause the stripper to be incorrectly positioned relative to the grate strand, with the result that ore pellets fall in a red hot stream through the clearance between the horizontal stripper and the path of the travelling grate and onto the walkway grating conventionally positioned beneath the stripper region, these red hot pellets frequently causing warping or other damage to the walkway grating, as well as causing burning out of the dribble hopper positioned beneath the walkway grating.

While it has been known in the prior art to provide forced air cooling for the interior of a horizontal stripper support beam of the type hereinbefore described, any such air cooling of the prior art has merely served to reduce the operating temperature level of both opposite longitudinal walls of the support beam without reducing the temperature differential between the opposite walls of the support beam to a sufficient extent to eliminate the beam deflection problem hereinbefore described. In the air cooling arrangements of the prior art for beams of this type where the cooling air has merely been blown into the hollow interior of the beam and equally in contact with both opposite longitudinal walls or webs of the beam, it is not economically feasible to blow sufficient air into the interior of the beam to reduce the temperature differential between the two opposite walls of the beam to an acceptable value.

SUMMARY OF THE INVENTION

Accordingly, it is an object of the present invention to provide an apparatus for and a method of controlling the temperature differential between different surfaces or walls of a structural member such as a box beam or the like, and to provide a structural member whose temperature differential is so controlled.

It is another object of this invention to provide an apparatus for and a method of controlling the temperature differential between the opposite walls of a beam used to support a stripper member associated with a grate conveyor in a Grate-Kiln system or the like, whereby to maintain proper adjustment of the stripper member relative to the grate conveyor.

It is still a further object of the invention to provide in a structural member of the type having a substantial and undesirable temperature differential between different walls or surfaces thereof, such as the box beam which supports the horizontal stripper in a grate conveyor system, of means for cooling the hotter wall whereby to reduce the temperature differential between the different walls or surfaces to an acceptable value.

It is a further object of the invention to provide in combination with a grate conveyor of the type operating in a Grate-Kiln system or the like a support beam for supporting the stripper member which strips the load of ore pellets or the like from the conveyor, and in which the support beam is provided with means for differentially cooling the opposite exposed walls of the support beam in such manner as to minimize deflection of the support beam during operation of the system.

In achievement of these objectives, there is provided in accordance with an embodiment of this invention an apparatus for and a method of controlling the temperature differential between different surfaces or walls of a structural member such as a hollow box beam, and a structural member whose temperature differential is so controlled, and to the combination of such structural member used as a support for the horizontal stripper associated with a grate conveyor or the like. The invention has important utility in the combination in which it controls the temperature differential between the opposite walls of the box beam which conventionally supports the horizontal stripper member used for stripping hot ore pellets or the like from the surface of a grate conveyor or the like since one of the walls of the box beam which supports the horizontal stripper is normally subjected to much higher temperatures than the opposite wall thereof, causing undesirable deflection of the beam. In accordance with an embodiment of the invention, a partition is provided inside the hollow box beam at a predetermined spacing from the hotter wall whereby to define a cooling chamber for the hotter wall, and cooling air is circulated through the cooling chamber at a predetermined velocity and pressure whereby to reduce the temperature of the hotter wall and thereby reduce the temperature differential between the two opposite walls of the box beam. Means may be provided for sensing the temperature differential between the opposite walls of the beam and for controlling a variable or variables such as the velocity and pressure of air passing through the cooling chamber as a function of the sensed temperature differential whereby to maintain the temperature differential between the opposite walls at an acceptable value.

Further objects and advantages of the invention will become apparent from the following description taken in conjunction with the following drawings in which:

BRIEF DESCRIPTION OF THE DRAWINGS

FIG. 1 is a diagrammatic view in longitudinal elevation showing the improved differentially cooled support beam for the horizontal stripper in a Grate-Kiln system or the like;

FIG. 2 is a diagrammatic top plan view of the stripper support beam showing the undeflected shape of the beam in full line and showing the deflected shape of the beam in dot-dash line;

FIG. 3 is a perspective view of the box beam of FIG. 1;

FIG. 4 is a view in vertical section of a box beam having the cooling arrangement of the invention but with a modified arrangement of the inlet and outlet passages to the cooling chamber;

FIG. 5 is a view in vertical section of a structural member of circular cross section, showing the adaptation of the cooling construction to a beam of circular cross section;

FIG. 6 is a view in vertical cross section of a structural member of circular cross section having more than two surfaces or wall portions at different operating temperatures, and showing the adaptation of the cooling arrangement of the invention to such a structural member; and FIG. 7 is a diagrammatic view showing a system for sensing the temperatures of the opposite exposed surfaces or walls of a horizontal stripper support beam or the like and for controlling the forced air supply to the cooling chamber whereby to control the differential temperature between the two opposite exposed walls of the support beam under changing temperature conditions.

DESCRIPTION OF THE PREFERRED EMBODIMENT

Referring now to FIG. 1, there is diagrammatically shown a grate conveyor generally indicated at 10 of the type used for conveying heated pelletized ore or the like to a rotary kiln in a system of the type shown, for example, in U.S. Pat. Nos. 2,925,336 — Stowasser, 3,110,483 — Baxa, 3,110,751 — Bade, or 3,396,952 — Jennrich et al. Heated pelletized ore or the like which reaches the end of the upper run of grate conveyor 10 is stripped from the grate conveyor by a horizontal stripper member generally indicated at 12, the stripper member 12 delivering the stripped ore to an inclined chute generally indicated at 14 through which the stripped ore passes to a rotary kiln or the like (not shown) for further processing. Stripper member 12 is pivotally supported at 16 by a suitable pivotal support means nounted on the upper end of the steel support beam generally indicated at 18. Beam 18 may be formed of two steel channels welded together in face-to-face relation as indicated at 21. Stripper 12 is also pivotally connected intermediate its left-to-right dimension with respect to the view of FIG. 1 at point 25 to a vertical rod 23 which is externally threaded at least on the portion thereof in the region of the nut member 24. The rod 23 passes through a suitable passage in a stationery stop member or structure 26. A spring 28 bears against an abutment 30 carried by the lower end of rod 23 beneath the stationery stop member 26 in such manner as to bias rod 23 downwardly to a position in which nut member 24 on rod 23 abuts against the upper surface of the stop 26 or against a stop plate bearing against the upper surface of the stop 26. By suitably adjusting nut 24 to a predetermined position on the threaded portion of rod 23, the angular position and clearance of stripper 12 relative to the discharge end of grate conveyor 10 can be suitably adjusted. At the same time, the spring bias arrangement provided by spring 28 and the rest of the structure just described permits stripper 12 to swing in a clockwise direction with respect to the view shown in FIG. 1 if necessary to permit passage of an otherwise obstructing pellet or the like passing between the discharge end of the grate conveyor and the stripping edge of stripper 12. In a typical installation there may be a clearance or one-sixteenth inch, for example, between the surface of stripping edge 19 of stripper member 12 and the facing surface of the moving grate conveyor 10.

A walkway grating generally indicated at 34 is provided beneath grate conveyor 10, and also beneath the region of stripper 12. Any pellets falling off the conveyor 10 or off the stripper 12 fall through grating 34 and into the dribble hoppers 36 beneath the walkway grating 34. A suitable conveyor (not shown) is positioned beneath the dribble hoppers to receive material discharged from the dribble hoppers.

Referring now in more detail to the box beam generally indicated at 18 which supports the stripper member 12, it will be noted that the longitudinally extending web or wall 20 of the box beam faces the downwardly moving portion 10A of the grate conveyor at the discharge end of grate conveyor 10. In a typical installation, grate conveyor portion 10A might be at a red hot temperature of from 1,200° – 1,400° F. and frequently as high as 1,600° Fahrenheit when a thin pellet bed or greatly reduced speed of the grate conveyor is required. The opposite longitudinal web or wall 22 of support beam 18 is directed toward or faces the chute 14 and the rotary kiln (not shown). The atmosphere of the heated air contiguous the outer surface of wall or web 22 of box beam 18 is typically in the range of 400° – 500° F. Since the outer surface of wall 20 of the box beam is exposed to radiation from the very high temperature grate conveyor portion 10A, as just mentioned, the wall 20 of beam 18 reaches a much higher temperature in normal operation than the opposite wall 22 in the absence of the invention which is to be described hereinafter. This substantial differential in temperature between the wall 20 and the wall 22 in the prior art stripper support beam causes a deflection of the hotter wall 20 (that is, the wall of the beam 18 facing the grate conveyor) in the direction of grate conveyor 10 in such manner as to cause a deflection of beam 18 to a position such as the dot-dash line position shown in FIG. 2 of the drawing. This deflection of the box beam as just described is very undesirable since it causes movement of the stripper edge 19 of the horizontal stripper 12 too far toward the moving grate conveyor 10, thereby causing undesirable wear on or damage to the stripper edge 19 of horizontal stripper 12. On the other hand, if the position of the stripper is adjusted to allow for the deflection or bowing of the box beam toward the grate conveyor 10, hot pellets may, under changed operating conditions, fall through the clearance space between the stripper edge 19 of the horizontal stripper 12 and the grate conveyor 10.

In accordance with the present invention, a longitudinally extending partition member 38 is provided and suitably secured on the interior of the hollow box beam 18 at a calculated optimum position contiguous to but spaced from the "hot" side 20 of the beam by a calculated distance such as distance "X" of FIGS. 1 and 4 so as to form a cooling chamber 40 of predetermined size or volume into which a cooling fluid such as air is introduced to provide forced circulation of the cooling fluid through cooling chamber 40 at a predetermined optimum pressure and rate of flow (cubic feet per minute) sufficient to reduce the temperature of the hot side 20 to a value at which the temperature differential between the walls 20 and 22 is an acceptable value. Partition 38 extends in parallel relation to wall 20 for the entire length of wall 20.

In the description of the preferred embodiment and in the drawings corresponding thereto, it has been assumed that the cooling fluid which is pumped through the chamber 40 of FIG. 1 is air. However, it is also within the scope of this invention to use other suitable cooling fluids, such as a suitable cooling liquid, such as water, for example.

In the illustrated embodiment of FIG. 1, air is pumped into cooling chamber 40 by a fan generally indicated at 42 which is connected by a suitable duct means 44 to the inlet 46 adjacent one of the transverse ends of chamber 40. It will be understood, of course, that each of the opposite transverse ends of box beam 18 (i.e., transverse of the longitudinal axis of beam 18) are suitably closed as by flanged plates 45 so that air is admitted in the illustrated embodiment to chamber 40 only through the inlet passage 46 via duct 44 and air is exhausted from chamber 40 only through outlet passage 48. As seen in the view of FIG. 3, a suitable outlet passage 48 is provided communicating with the opposite end of the interior of cooling chamber 40. The cooling air passing out through passage 48 is exhausted to atmosphere.

The geometrical dimensions of cooling chamber 40 are so proportioned and are so coordinated and related to the other parameters of the fluid flow circuit, comprising the fan 42 and its fluid output characteristics, the duct 44, the inlet passage 46 and the outlet passage 48, and to the various heat transfer factors involved, all as set forth in the formulae which follow, so as to provide air flow at a predetermined optimum average pressure and rate of flow (cubic feet per minute) through cooling chamber 40 for a known possible range of differential temperatures between the opposite walls 20 and 22 so as to reduce the temperature of the hotter wall 20 sufficiently to provide a temperature differential between walls 20 and 22 having an acceptable value, with a consequent predictable and acceptable deflection of beam 18 over the anticipated range of temperature differentials between beam walls 20 and 22. Fan 42 is preferably provided with means for adjusting the speed thereof to permit adjustment of the output of the fan to obtain the optimum average air flow rate for the anticipated range of temperature differentials, based upon operating experience after installation, and also to permit air flow adjustment for varying operating conditions, if desired, rather than keeping the fan at a fixed speed corresponding to an optimum average air flow rate.

In practicing the invention in accordance with the apparatus and method of the present invention, the temperature differential between the hotter surface 20 and the cooler surface 22 is not necessarily completely eliminated but may only be reduced to an acceptable predictable value with a corresponding predictable deflection of support beam 18 of a magnitude which can be tolerated.

The chamber 50 defined between the partition 38 and the inner surface of the beam wall 22 is subjected on the interior thereof to normal atmospheric pressure through a vent 52 through wall 22. Chamber 50 is closed at the opposite transverse ends thereof by the same closure plates or the like which close the ends of cooling chamber 40.

In the embodiment shown in FIGS. 1 and 3, the inlet and outlet passages 46 and 48 enter the cooling chamber 40 directly through the hotter wall 20.

On the other hand, in the embodiment shown in FIG. 4, the inlet and outlet ducts 44' and 48' enter beam 18' through the cooler wall 22' and pass across the chamber 50' before being connected to the interior of the cooling chamber 40'. The interior of chamber 50' is connected to atmospheric pressure through the clearance space 52' between the outer periphery of one of the respective ducts 44' and 48' and the wall 22'. In the embodiment of FIG. 4, wall 20' is assumed to be the hotter wall facing the grate conveyor and wall 22' is assumed to be the cooler wall.

The embodiments of the invention described in connection with FIGS. 1–4, inclusive, have all shown the invention as applied to a support beam of hollow rectangular cross section. However, the invention can be applied to beams of any reasonable shape and the principle of the invention is illustrated in FIGS. 5 and 6 in connection with support beams or structural members of hollow circular cross section. Thus, referring to FIG. 5, there is shown a structural member or support beam generally indicated at 51 which is of hollow circular cross section. The surface or wall portion 51A of the beam is considered to be the wall portion which is at a substantially higher temperature $T_1$ than the temperature $T_2$ of the wall portion indicated at 51B which extends along the remainder of the 360° circumference of the structural member. In order to provide an increased cooling of the hotter wall portion whereby to reduce the temperature differential between wall portions 51A and 51B, a cooling chamber indicated at 53 is defined by a radially inner arcuately extending wall 54 which extends in an arcuate path parallel to the surface 51A through the same peripheral angle as wall portion 51A for substantially the entire axial length of surface 51A. Wall 54 is spaced from wall portion 51A by a radial distance "X." Radially and axially extending walls 56 close the chamber 53 in a radial direction. Suitable transverse end walls or closure members preferably having the same area as the total cross sectional area of the circular cross section of beam 51 are placed at the opposite transverse ends of beam 51 to serve as end closures not only for the cooling chamber 53 but also as a closure for the hollow portion 58 of the interior of structural member 51 which is bounded by the wall portion 51B. Air inlet and outlet passages 60,62 are provided contiguous opposite axial ends of cooling chamber 53 in a manner similar to those described in connection with the embodiments of FIGS. 1–4 inclusive, through which cooling air may be admitted to and exhausted from cooling chamber 53 at a controlled pressure, and rate of flow in cubic feet per minute, in the same manner as and in accordance with the same principles as previously described in connection with the embodiments of FIGS. 1–4 inclusive, to provide a controlled temperature differential between wall portions 51A and 51B. The chamber 58 contiguous the cooler side 51B of the structural member 51 is open to atmosphere through a vent 64 in the same manner as described in the previous embodiments.

Referring now to FIG. 6 there is shown a still further modified structural form which may have the temperature differentials thereof controlled in the same manner as previously described. Referring now to FIG. 6 there is shown a structural member generally indicated at 70 of circular cross section and including a first wall portion 70A which is exposed to a temperature T-1A, a second wall portion 70B which is exposed to a temperature of T-2A and a third wall portion 70C which is exposed to a temperature T-3A. A cooling chamber indicated at 72 is provided contiguous the wall portion 70A by means of an arcuate wall 76 which is spaced radially inwardly of wall portions 70A and 70B by a radial distance X-1, the radially inner wall 76 extending axially for the entire length of the wall portions 70A and 70B. The boundaries of the cooling chamber 72 in a circumferential direction are determined by the radially and axially extending walls 78 and 80 which enclose the cooling chamber 72 at the opposite circumferential ends thereof. Cooling air is introduced to and exhausted from the cooling chamber 72 by means of inlet and exhaust ducts 82, 84 in the same manner as previously described and in accordance with the principles previously described to reduce the temperature of wall portion 70A to a value having a predetermined temperature differential relation with respect to wall portions 70B and 70C.

In a similar manner, cooling chamber 86 is defined radially inwardly of wall portion 70B by the arcuately and axially extending wall 76 and by the radially and axially extending end walls 80 and 88 which define the circumferential boundaries of cooling chamber 86. Cooling air is introduced into and exhausted from cooling chamber 86 by inlet and outlet ducts 90, 92 in the same manner as previously described and cooling air at a predetermined pressure and velocity is passed through the chamber 86 to reduce the temperature of the wall portion 70B to a predetermined desired value for a desired temperature differential relation in accordance with the principles previously described.

The wall portion 70C which operates at a lower temperature than the wall portions 70A and 70B bounds a chamber 94 which is closed at the opposite ends thereof but which is connected to atmosphere through a vent 96.

Suitable transverse end closures for beam 70 are provided for the opposite ends of beam 70 similar to the end closures such as 45 (FIG. 3) described in connection with the previous embodiments.

Referring now to FIG. 7, there is schematically shown a control system which may be used to control the temperature differential between the higher temperature wall 120 and the lower temperature wall 122 of a horizontal stripper support beam 118 similar to that shown in FIG. 1 despite changes in the temperatures of the walls 120 and 122 due to changing operating conditions. The beam 118 is provided with a partition 138 similar to the partition 38 described in connection with the embodiment of FIG. 1, to define a cooling chamber 140 for the hotter wall 120. The cooling chamber 140 is connected by duct 146 to a fan 147 driven by a fan motor 148. The cooling chamber 140 is also provided with an outlet passage (not shown) in the same manner as shown in previous embodiments, and the size of the cooling chamber 140 is made of a predetermined geometrical size based upon a proper coordination with fan 147 and the other parameters as previously described in connection with the embodiment of FIG. 1 to give proper rate of air flow in cubic feet per minute, and air pressure over the range of normally anticipated temperature differentials between the hotter wall 120 and the cooler wall 122. The chamber 150 between partition 138 and the cooler wall 122 is connected to atmospheric pressure through vent 152 in the same manner as described in the previously described embodiments.

In order to more precisely control the cooling action of cooling chamber 140 to accommodate changes in temperature differential between wall 120 and wall 122 under various operating conditions, the control circuit now to be described is provided. A thermocouple 124 is suitably placed in thermal contact with the outer surface of the wall 120 of stripper support beam 118 and is connected by electrical conductor means 126 to an electrical amplifier 128. In a similar manner, a thermocouple 130 is positioned in thermal contact with the outer wall surface of wall 122 of the stripper support beam 118. The electrical output signal from thermocouple 130 is connected by electrical conductor means 132 to an electrical amplifier 134. The respective thermocouples 124 and 130 generate electrical signals which are representative of the temperatures of the respective beam walls 120, 122. The output signal from amplifier 128 corresponding to thermocouple 124 is fed by conductor means 136 to the input of a differential amplifier 139 and, in a similar manner, the output signal from amplifier 134 corresponding to thermocouple 130 is connected by conductor means 141 to the input of the differential amplifier 139. The differential amplifier 139 provides an output signal to control 144 over output conductor means 142 which is a function of or representative of the temperature differential between the hot side 120 and the cooler side 122 of stripper support beam 118.

The differential amplifier 139 may be, for example, a floating differential amplifier, Model 8300 − XWB, sold by Preston Scientific Inc., 805 East Cerritos Avenue, Anaheim, California 92805, as listed at page 1,293 of the 1971–1972 Electronic Engineer's Master Catalog, published by United Technical Publications, 645 Stewart Avenue, Garden City, New York.

Control 144 controls the speed of the fan motor 148 thereby controlling the velocity and pressure of cooling air and hence the rate of flow of cooling air in cubic feet per minute fed via duct 146 to the interior of cooling chamber 140 as a function of the differential between the temperatures of the hotter wall 120, and the cooler wall 122. Thus, if the temperature differential between walls 120 and 122 increases, the speed of fan 147 is increased; and if the temperature differential between walls 120 aand 122 decreases, the speed of fan 147 is decreased. Other devices suitable for use as a differential amplifier 139 are also well known and commercially available.

The control 144 could be an analog controller such as that made by Foxboro Co., Foxboro, Massachusetts, Model 67HSTGZ-E, as described in Foxboro Bulletin No. GS 2A-4D1 B, July, 1966, or instead may be a digital computer, such as Model TCT88, made by Foxboro Co., Foxboro, Massachusetts, described in Foxboro Bulletin L-19, November, 1965.

A control system of the type diagrammatically shown in FIG. 7 is not new per se and is shown, for example, in U.S. Pat. application Ser. No. 33,811 of Hugh S. Drewry, filed in the United States Patent Office on May 1, 1970.

The theoretical heat transfer considerations upon which the dimensions and geometry of the cooling chamber and other parameters of the cooling arrangement for the wall being cooled are based, as applied to the embodiments of FIGS. 1–4, for example, are set forth in the following formulae: Heat transferred to the wall 20 of support beam 18

$$= Q = (hc + hr) A_0 \Delta T$$

$hc = C\, k/L\, (aL^3 \Delta T)^n$ $hr = \sigma\, Fe\, Fa\, ([T_1^4 - T_2^4]/\Delta T)$ where:
- $hc$ = heat transfer coefficient due to natural convection
- $hr$ = heat transfer coefficient due to radiation
- $A_0$ = area exposed to the heat transfer
- $\Delta T$ = Temperature difference between the wall 20 of support beam 18 and the surrounding ambient
- $C = 0.55$ and $n = \frac{1}{4}$ for $10^3 < aL^3 \Delta T < 10^9$
- $C = 0.13$ and $n = \frac{1}{3}$ for $10^9 < aL^3 \Delta T$
- $k$ = conductivity of the gas film
- $L$ = vertical height of the heat transfer surface
- $a$ = function of film gas properties
- $\sigma$ = Stefan Boltzman constant
- $Fe$ = function of emissivities
- $Fa$ = configuration factor
- $T_1 \& T_2$ = absolute temperatures Heat transferred to the cooling air =

$$= hi A_i \Delta t = W C_p \Delta t$$

$$hi = 0.023\, k/D\, (N_R)^{0.8}(R_{Pr})^{0.4}$$

where:
- $hi$ = inner heat transfer coefficient due to forced convection
- $A_i$ = inner heat transfer area
- $\Delta t$ = temperature difference between inner surface and the cooling air
- $W$ = weight flow rate of cooling air
- $Cp$ = specific heat of cooling air
- $k$ = conductivity of cooling air
- $D = 4R_H$
- $R_H$ = hydraulic radius
- $N_R = DV\rho/\mu$ = Reynold's number
- $N_{Pr} = CP\mu/K$ = Prandt's number
- $V$ = velocity of cooling air
- $\rho$ = density of cooling air
- $\mu$ = viscosity of cooling air Heat transferred to wall 20 of support beam 18 equals heat transferred to the cooling air; therefore $$(hc + hr)\, A_o\, \Delta T = hi\, A_i\, \Delta t = W C_p\, \Delta t$$

from which $N_R$, $D$, and $W$ are obtained by adjusting the cross sectional area of cooling chamber 40 by adjusting the distance "X" of FIGS. 1 and 4.

The formulae given hereinbefore could be applied to any of the embodiments of FIGS. 1–7, inclusive.

In connection with the heat transfer theory set forth in the foregoing formulae, reference is made to the following textbook, particularly at pages 73, 103 and 135 thereof:

"Introduction to Heat Transfer" by Aubrey J. Brown and Salvatore M. Marco, Second Edition, Second Impression, McGraw-Hill Book Company, Inc., New York, Toronto, London, 1951.

Reference is also made to the handbook entitled "Fan Engineering," Copyright, 1914, by The Buffalo Forge Company, Buffalo, New York, particularly the section thereof entitled "Laws of Fan Performance," at pages 179–181, inclusive, thereof. The exact title of the foregoing handbook is as follows: "Engineers Hand-Book of Tables, Charts and Data on the Application of Centrifugal Fans and Fan System Apparatus, Including Engines and Motors, Air Washers, Hot Blast Heaters and Systems of Air Distribution," Edited by Willis H. Carrier, Chief Engineer.

From the foregoing detailed description of the present invention, it has been shown how the objects of the invention have been obtained in a preferred manner. However, modifications and equivalents of the disclosed concepts such as readily occur to those skilled in the art are intended to be included within the scope of this invention.

The embodiments of the invention in which an exclusive property or privilege is claimed are defined as follows:

1. A hollow structural member comprising a first wall portion and a second wall portion in laterally spaced relation to and opposite to each other, said structural member being intended for use in an environment in which said first wall portion is normally exposed to a substantially higher temperature than said second wall portion, and means defining a cooling chamber for said first wall portion whereby to maintain the temperature differential between said first wall portion and said second wall portion at an acceptable value and thus limit undesirable deflection of said structural member, comprising a partition member interposed between said first and said second wall portions in laterally spaced relation to both said first and said second wall portions, said partition member extending for substantially the entire length of said first wall portion, said cooling chamber being bounded along one longitudinal side thereof by said first wall portion and along the opposite longitudinal side thereof by said partition member, said cooling chamber being provided with an inlet contiguous one end thereof for admitting cooling fluid thereto and an outlet contiguous an opposite end thereof for exhausting cooling fluid therefrom.

2. A hollow structural member as defined in claim 1 in which said partition member is positioned laterally closer to said first wall portion than to said second wall portion.

3. A hollow structural member as defined in claim 1 having connected to said cooling chamber means for forcing cooling fluid through said cooling chamber from said inlet to said outlet of said cooling chamber.

4. A hollow structural member as defined in claim 1 in which said member is a box beam and said one wall portion is one wall of said beam and said another wall portion is an opposite wall of said beam.

5. A hollow structural member as defined in claim 1 in which said member is of circular transverse cross section.

6. A hollow structural member as defined in claim 1 in which said cooling chamber is additionally bounded by end closure means between said partition member and said one wall portion at opposite ends of said cooling chamber.

7. A box beam of generally hollow rectangular cross section comprising a first wall and a second wall in laterally spaced relation opposite to each other, and third and fourth walls extending laterally of said first and second walls and joining corresponding ends of said first and second walls whereby to define the generally hollow rectangular cross section of said box beam, said box beam being intended for use in an environment in which said first wall is normally exposed to a substantially higher temperature than said second wall, and means defining a cooling chamber for said first wall whereby to maintain the temperature differential between said first wall and said second wall at an acceptable value and thus limit undesirable deflection of said structural member, comprising a partition member interposed between said first and said second walls, said partition member being positioned laterally closer to said first wall than to said second wall, said partition member extending from said third wall to said fourth wall and for substantially the entire length of said first wall, said cooling chamber being bounded along one longitudinal side thereof by said first wall and along the opposite longitudinal side thereof by said partition member, end closure means between said partition member and said first wall at opposite ends of said cooling chamber, means contiguous one end of said cooling chamber for admitting a cooling fluid to said cooling chamber, and means contiguous an opposite end of said cooling chamber for exhausting cooling fluid from said cooling chamber.

8. In combination, a grate conveyor adapted to convey heated material thereon, a stripper member positioned to strip heated material from said conveyor contiguous the discharge end of the upper run of said conveyor, a beam member for supporting said stripper member, said beam member having a hollow interior, said beam member including one wall thereof facing said grate conveyor and another wall thereof disposed away from said grate conveyor, said one wall normally being exposed to a substantially higher temperature than said another wall, and means for cooling said one wall whereby to maintain the temperature differential between said one wall and said another wall at an acceptable value and thus limit undesirable deflection of said beam member, comprising a cooling chamber positioned within the hollow interior of said beam member contiguous said one wall, said cooling chamber extending along substantially the entire length of said one wall, whereby a cooling fluid flowing through said cooling chamber is in heat exchange relation with said one wall, said cooling chamber being adapted to be connected to a source of cooling fluid, said cooling chamber being adapted to exhaust cooling fluid therefrom which has passed through said cooling chamber.

9. The combination defined in claim 8 in which said beam member is a box beam.

10. The combination defined in claim 8 which further includes means connected to said cooling chamber for forcing cooling fluid through said cooling chamber from an inlet passage to an outlet passage of said cooling chamber.

11. The combination defined in claim 8 which further includes means for sensing the temperature differential between said one wall and said another wall, and means for controlling the cooling of said one wall as a function of the sensed temperature differential.

12. The combination defined in claim 8 in which said cooling chamber is bounded along one side thereof by said one wall and is bounded along an opposite side thereof by a partition member positioned within the hollow interior of said beam member in laterally spaced relation to said one wall, said partition member extending substantially parallel to said one wall.

13. The combination defined in claim 12 in which said cooling chamber is additionally bounded by end closure means between said partition member and said one wall at opposite ends of said cooling chamber.

14. In combination, a grate conveyor adapted to convey heated material thereon, a stripper member positioned to strip heated material from said conveyor contiguous the discharge end of the upper run of said conveyor, a box beam of generally hollow rectangular cross section for supporting said stripper member, said beam comprising a first wall and a second wall in laterally spaced relation opposite to each other and third and fourth walls extending laterally of said first and second walls and joining corresponding ends of said first and second walls whereby to define the generally hollow rectangular cross section of said box beam, said first wall of said box beam facing said grate conveyor and said second wall being disposed away from said grate conveyor, said first wall normally being exposed to a substantially higher temperature than said second wall, and means defining a cooling chamber for said first wall whereby to maintain the temperature differential between said first wall and said second wall at an acceptable value and thus limit undesirable deflection of said box beam, comprising a partition member interposed between said first and said second walls in laterally spaced relation to both said first and said second walls, said partition member being positioned laterally closer to said first wall than to said second wall, said partition member extending from said third wall to said fourth wall and for substantially the entire length of said first wall, said cooling chamber being bounded along one longitudinal side thereof by said first wall and along the opposite longitudinal side thereof by said partition member, end closure means between said partition member and said first wall at opposite ends of said cooling chamber, means contiguous one end of said cooling chamber for admitting a cooling fluid to said cooling chamber, and means contiguous an opposite end of said cooling chamber for exhausting cooling fluid from said cooling chamber.

15. In a structural member of hollow transverse cross-section, the method of maintaining a predetermined temperature differential between a first longitudinal wall and a second longitudinal wall disposed opposite said first wall in which said first wall is exposed to a substantially higher environmental temperature than the environmental temperature to which said second wall is exposed, whereby to limit to an acceptable value the deflection of said structural member due to the difference between said environmental temperatures, which method comprises the step of directing a cooling fluid through the hollow interior of said structural member contiguous and in heat exchange relation with said first wall and in substantially noncontiguous and substantially non-heat-exchange relation to said second wall, whereby to reduce the temperature of said first wall to a value at which an acceptable predetermined temperature differential between said first and said second wall is obtained.

16. The method defined in claim 15 which comprises the step of providing a cooling chamber within said structural member contiguous said first wall and passing a cooling fluid through said cooling chamber.

17. The method defined in claim 16 in which said cooling fluid is passed through said chamber at a predetermined pressure and velocity.

18. The method defined in claim 15 which includes the further steps of sensing the temperature differential between said first wall and said second wall and of controlling the flow of cooling fluid contiguous said first wall as a function of the sensed temperature differential.

19. The method defined in claim 15 in which said structural member is a box beam and said one wall is one wall of said beam and said another wall is an opposite wall of said beam.

20. The method defined in claim 15 in which said structural member is of circular cross section.

* * * * *